United States Patent [19]

Brown et al.

[11] 4,400,773
[45] Aug. 23, 1983

[54] INDEPENDENT HANDLING OF I/O INTERRUPT REQUESTS AND ASSOCIATED STATUS INFORMATION TRANSFERS

[75] Inventors: Paul J. Brown, Poughkeepsie; Robert J. Dugan, Hyde Park; Richard R. Guyette, Hopewell Junction, all of N.Y.

[73] Assignee: International Business Machines Corp., Armonk, N.Y.

[21] Appl. No.: 221,604

[22] Filed: Dec. 31, 1980

[51] Int. Cl.³ .............................................. G06F 3/04
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,675,209 | 7/1972 | Trost et al. | 364/200 |
| 3,725,864 | 4/1973 | Clark et al. | 364/200 |
| 3,886,525 | 5/1975 | Brown et al. | 364/200 |
| 4,004,277 | 1/1977 | Gavril | 364/200 |
| 4,042,914 | 8/1977 | Curley et al. | 364/200 |
| 4,073,005 | 2/1978 | Parkin | 364/200 |
| 4,123,794 | 10/1978 | Matsumoto | 364/101 |
| 4,166,290 | 8/1979 | Furtman et al. | 364/200 |
| 4,191,997 | 3/1980 | Luiz | 364/200 |

OTHER PUBLICATIONS

"Attached Processor", IBM TDB, vol. 23, No. 10, Mar. 1981, pp. 4481–4483 by E. G. Drimak et al.

*Primary Examiner*—Mark E. Nusbaum
*Assistant Examiner*—Mark P. Watson
*Attorney, Agent, or Firm*—R. Lieber

[57] ABSTRACT

A new instruction called Test Subchannel assures that one processor will not begin an I/O operation with device status information that has been outdated by an operation of another processor. When a device has status to present, a status pending bit and an interruption pending bit are set in the channel subsystem and an interruption request is made. When a processor accepts an interruption, the channel system resets the interruption pending bit but not the status pending bit. The processor that accepts the interruption updates the unit control block (UCB) in main store and resets the status pending bit in the subchannel unless the UCB has been locked by another processor that is starting an I/O operation on the same device. This invention prevents the other processor from operating with outdated status information in the UCB. A processor that has locked the UCB uses Test Subchannel to test the Status Pending bit in the subchannel. If status is pending, the processor executes a routine to update the UCB. Optionally, when a processor that is handling an interruption finds the UCB locked, it sets a flag bit in the UCB lock word. Before a processor resets the UCB lock, it checks the lock word and executes the Test Subchannel instruction if the flag is set.

8 Claims, 14 Drawing Figures (SPP ENVIRONMENT-NO MULTITAGGING)

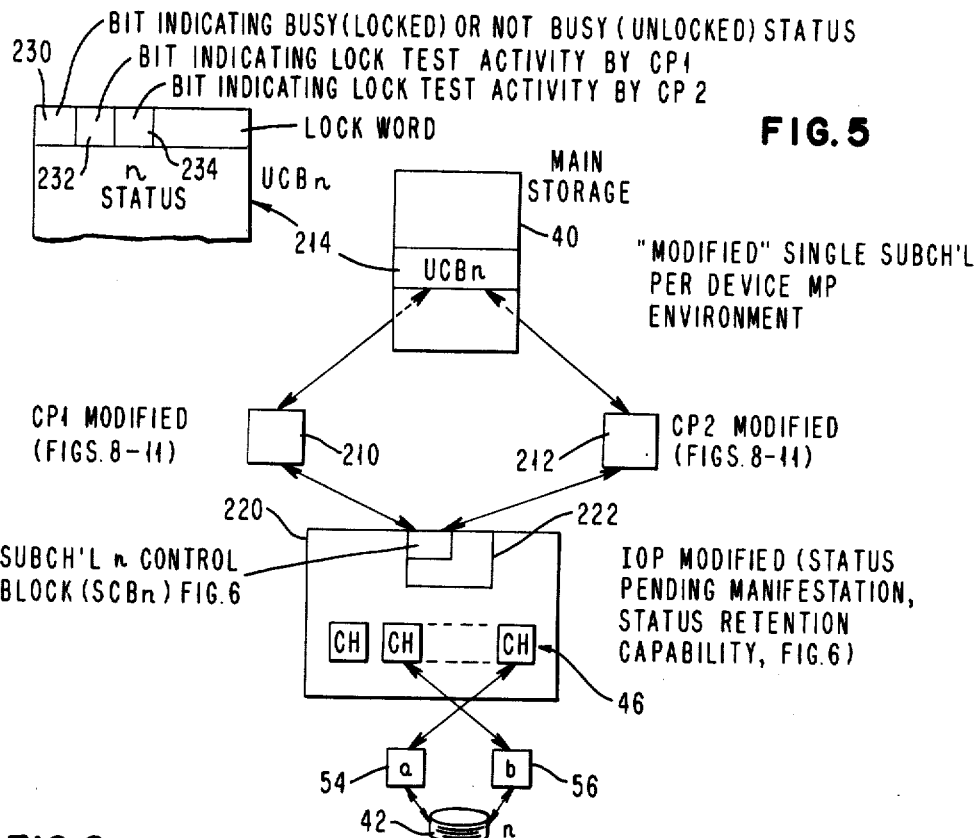
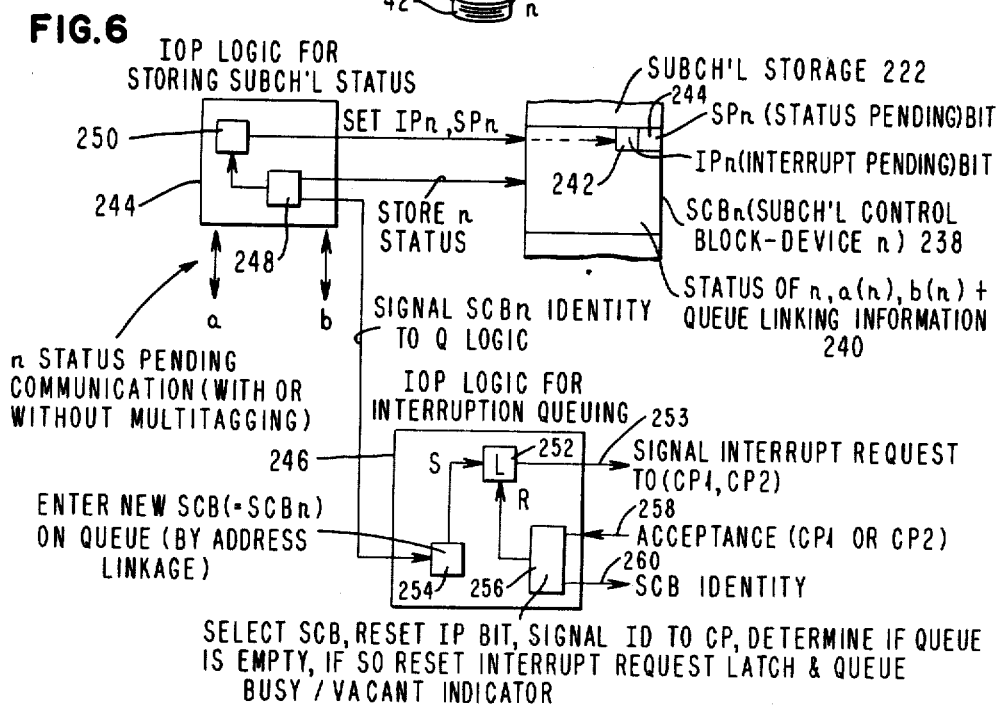

(EXECUTION OF TSCH)

INDEPENDENT HANDLING OF I/O INTERRUPT REQUESTS AND ASSOCIATED STATUS INFORMATION TRANSFERS

BACKGROUND

1. Field of the Invention

This invention concerns a method and associated apparatus for ensuring that multi-processing systems are able to maintain unambiguous control over communications of device status information via interruptions, and over utilization of such information in respect to starting operations at associated devices.

2. Problem Solved and Principal Objects

In contemporary tightly coupled multi-processing systems, wherein plural central processing elements (hereinafter CP elements or CP's) share an operating system (supervisory programs), main storage facilities, and devices, each attempt to start an operation of a device is predicated on status information contained in a UCB (Unit Control Block) table in main storage which is uniquely associated with the device (refer to OS I/O Supervisor Logic, GY 28–6616 Pages 3–9). In such systems CP's working relative to a shared device may have interfering access to an associated UCB with potentially destructive effects.

For example, one CP may be working to start an operation at a device shared with another CP while the other CP is handling an interruption associated with the status of the same device. These CP's may be in communication with different I/O channel, subchannel and control unit paths not commonly accessible to both. Although the CP which is seeking to start the operation may be programmed to explicitly test the status of the device, via an I/O path affiliated with that CP (refer to IBM System/370 Principles of Operation, GA22-7000 Pp 208, 209 and GY 28-661 Supra, pages 17–2), and thereby recover status information manifested in that path, such tests would not enable that CP to recover status information which is manifested in a path accessible only to another CP. However, the locking of the UCB by the first CP may prevent the other (interruption handling) CP from updating the UCB. Accordingly, the device operation may be started with reference to outdated status information which is not distinguishable as such. This can result in destructive error, and cause the central operating system to be burdened with wasteful "overhead" processes for error analysis and recovery.

For example, assume that while a first CP, CP-A, is handling an interruption associated with a manual change of disk packs in a DASD file, a second CP, CP-B, is working to start an output (writing) operation relative to the removed pack. Assume also that CP-B has exclusive (locked) access to the UCB associated with the DASD file. In this circumstance, the output operation might be started by CP-B relative to the wrong (newly mounted) disk pack, because CP-B is incapable of distinguishing the change in status associated with the interruption (since associated conditions which reflect this change will have been cleared from the connection path associated with CP-A when CP-A first accepted the interruption, and may not be manifested in the I/O path over which CP-B is attempting to operate). The resulting output operation could overwrite data previously recorded on the newly mounted pack, and thereby destroy valid (and possibly important) data.

A principal object of the present invention is to provide a method and associated apparatus for avoiding such CP interferences and associated destructive effects.

In contemporary multi-processing systems such interferences are avoided by adapting the shared device to communicate its changed status condition redundantly, to each sharing CP, over each path through which it can communicate with the CP's. However, this procedure, which is called multi-tagging of status, requires all CP's to redundantly process interruptions relative to a single status change event. Obviously, this is less efficient than having a single status change event processed by a single CP.

Therefore, another object of this invention is to provide a method and apparatus for enabling central processing elements of a multi-processing system to coordinate their handling of interruptions which relate to changes in status of a shared device, and their handling of associated status information, whereby the status communication process associated with any single status change event may be handled by a single central processing element, and yet not expose the system to potential errors in respect to the scheduling of new operations at the associated device.

It has also been proposed that I/O channels be adapted to have dynamically variable ("floating") affiliations with central processors, whereby an I/O processing subsystem shared by such channels could be delegated responsibility for assigning paths for communicating with the devices, and for managing the accounting processes associated with such assignments, and thereby relieve the central complex and its operating system of the burden of having to specify and manage such paths (refer to Clark et al's U.S. Pat. No. 3,725,864 issued Apr. 3, 1974). In such so called "floating channel" systems the inefficiency of the "multi-tagging" technique would be compounded by the dynamic variability of channel path assignments to the multiple CP's constituting the central complex, that is, it would be difficult to ensure that each CP would be redundantly required to process interruptions relative to a single status change event.

In the above-referenced Clark et al patent, it had also been proposed to provide a single subchannel for each device in the I/O processing subsystem, apparently to provide a unique communication node for each device, relative to the central complex, regardless of the number of physical channel paths which may be able to link the device to the central complex at any time. However, such concentration of subchannel storage facilities does not ensure that operations of the associated device will always be started with reference to the most current status information. For example even with multi-tagging of status, status could be cleared from the device to one CP over one path followed immediately by initiating signals from another CP to the device over the same path; thus starting the device without the initiating CP being notified of the changed status.

Accordingly the present invention seeks to provide a method and apparatus effective in such floating channel environments for enabling a CP to handle a status interruption from a shared device without exposing the system to a potentially erroneous starting operation due to concurrent operation of another CP relative to the same device.

SUMMARY OF THE INVENTION

In accordance with the present invention, when a change of status occurs at a peripheral device which is linked to plural CP's via an I/O processing facility (IOP) associated with a collection of "floating" I/O channels, the IOP stores a status pending indication (SP), in a subchannel uniquely associated with that device, together with the status change information and an indication of interruption pendency (IP) relative to the CP's. These SP and IP indications are examined and cleared by entirely different CP actions. The IP condition is cleared when a CP acting independent of its operating system accepts an I/O interruption associated with the respective subchannel.

However, the SP condition and the associated status information remain stored in the subchannel after clearance of the IP condition, and in accordance with the subject invention the CP's of the central system complex are required by their common operating system, acting in conjunction with apparatus in accordance with the present invention, to test the subchannel and recover any preserved status. Such testing and recovery is performed under circumstances which preclude initiation of a device operation with reference to incorrect or outdated status.

Apparatus is provided in each CP for executing an operation specified by an instruction "test subchannel" (TSCH), which is newly defined in accordance with the subject invention. This operation permits the operating system to explicitly test a specified subchannel for an SP condition and to recover status in an atomic (uninterruptable) mode of operation. When executing a TSCH operation the CP examines a program specified subchannel for an SP condition, clears such condition if it finds one, recovers status if relevant, and sets a condition code for sequence branching indicating if an SP condition has or has not been cleared. This enables the operating system to cause the CP to update the UCB status. The apparatus of the subject invention operates in association with programming conventions which ensure that a TSCH operation will be executed in due time relative to a status-pending subchannel, thereby ensuring that the associated UCB will be updated before any CP having access to that UCB can cause a stimulus for starting the associated device to be passed through the subchannel.

These conventions require that the UCB be accessible on a serial basis to only one CP at a time, and that a CP having access to a UCB while working to start an operation at the associated device must examine the subchannel for an SP condition during execution of any device initiating instruction (whereby a TSCH operation may be interpolated, if necessary). Additional restrictions, which are desirable but not essential to the operation of the present invention, require that a CP which has access to a UCB (and may, for instance, be working to start a device operation) must act just prior to relinquishing its control of that UCB to examine a flag field within the lock word which governs its access to the UCB. This field indicates whether or not any other CP has been competing (unsuccessfully, of course) for access to that UCB during the tenure of control of this CP. If such competition is indicated the "relinquishing" CP is required to execute a TSCH operation and, if necessary, update status in the UCB. These additional restrictions, and the associated flag examination and status recovery operations, enable a CP which may be handling an interruption task associated with a change in subchannel status, and which is unable to access the UCB, to abort its operation in respect to that task, while ensuring that the CP then having control of the UCB will in effect complete the status updating portion of the aborted operation.

In the preferred mode of operation of the subject invention, as disclosed infra, the foregoing conventions are implemented by operations of "compare and swap" apparatus disclosed in U.S. Pat. No. 3,886,525 by P. J. Brown et al. By means of such operations a CP which bids for access to a UCB modifies a lock field in the UCB to indicate its contention and examines the previous contents of that field to determine if the UCB is locked (i.e. controlled by another CP). If the UCB is locked, the contending CP may either perform other operations or "spin on the lock" (i.e. repeat its examination of the UCB lock after a suitable idling period), depending on the applicable program restrictions.

On the other hand, if a processor which is handling an interruption task obtains access to the UCB, that processor is required by its program to execute a TSCH operation; whereby it will clear the SP condition "directly", and complete the task (recover status from the subchannel, update the UCB, etc.).

The foregoing and other objects, features and advantages of our invention may be understood more completely by referring to the following detailed description and claims.

DESCRIPTION OF THE DRAWINGS

FIGS. 5-11 illustrate adaptation of a floating channel MP system, of the type shown in FIG. 2, in accordance with the present invention;

DETAILED DESCRIPTION

1. Introduction

Figure 1:
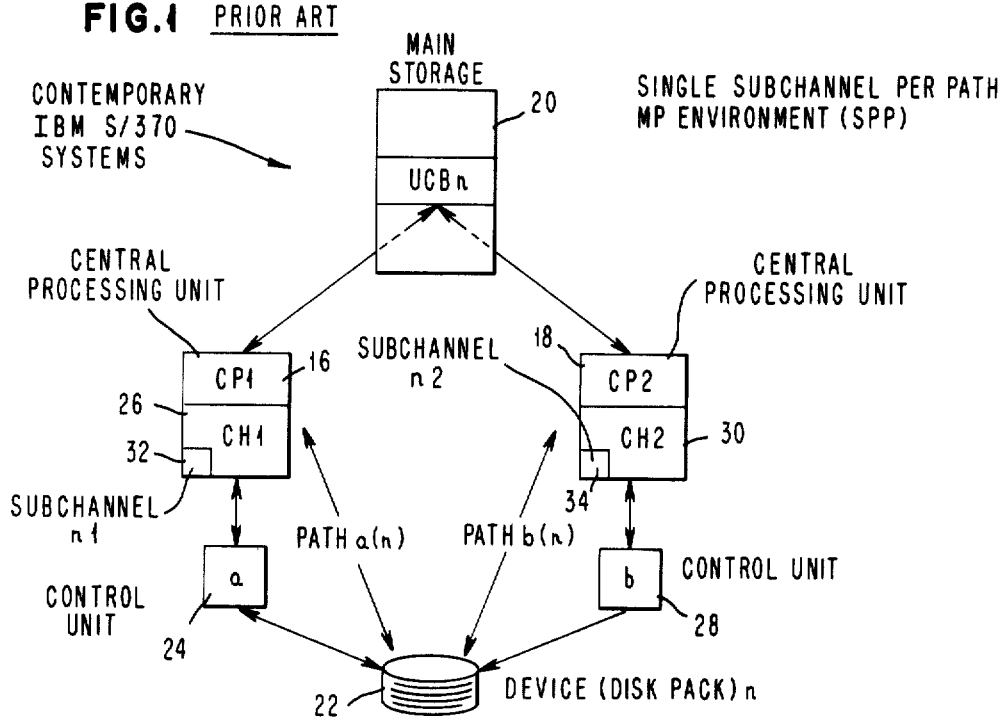
FIGS. 1 and 2 illustrate how the problem situation addressed by the subject invention occurs in various prior art MP system environments.

In contemporary data processing systems which are configured for multiprocessing (MP) operation a peripheral device may communicate with plural central processing elements (hereafter CP's) in a host central processing complex through plural I/O channel paths. In such MP systems two CP's may operate concurrently, under a shared operating system (supervisory program), to perform different functions relative to one shared device. One CP may be working to start an operation at the device and the other CP may be handling an interruption task associated with a change in status communicated from the same device.

In such systems the device status information which is used by the operating system as the principal reference for scheduling operation of a given device is stored in a Unit Control Block (UCB) space in main storage. Each device has one uniquely associated UCB. Since any UCB is effectively accessible to only one CP at a time it is possible for CP's to interfere with each other so that one may start an operation of the associated device with reference to outdated status information because the UCB is being controlled by the initiating CP and is therefore currently inaccessible for receiving new status information.

It has also been recognized for some time, by those skilled in the art, that such systems can be operated more efficiently if their I/O channels are adapted to have dynamically varying or "floating" relationships of connection affinity with CP's (refer to the Clark et al U.S. Patent supra) thereby permitting the CP's to delegate responsibility to the I/O channel processing subsystem for selecting channel paths over which to conduct I/O operations and for managing the accounting for such paths; whereby the central work load associated with these aspects of I/O operation may be eliminated.

As noted previously, in such system environments, particularly in the floating channel—single subchannel per device—type of environment, it is possible for a CP which is working to start a device operation to "miss" important status change information which is being handled by another CP in response to an interruption, since the subchannel is cleared when the interruption is accepted (as used herein the term "subchannel" means the collection of channel facilities required for sustaining a single I/O operation, and includes the facilities used by the channel processing subsystem for storing data storage addresses, transfer counts and any status and control information associated with the operation). At such times the changed status may not be posted in the associated UCB, which is the principal status reference of the central complex, because the UCB is only accessible to one processor at a time. Accordingly, the UCB may be controlled by a CP which is working to start the device operation and inaccessible to a CP which is processing an interruption relative to the same device. This can result in initiation of device operation with reference to erroneous data and impose a heavy burden of error analysis and recovery procedures on both the central complex and the I/O subsystem.

Consider for instance the potential effect of having one CP prepare and initiate an output (writing) data transfer relative to a specified disk pack device, while another CP is processing a "status change" interruption associated with the removal of the specified pack (e.g. by a human/operator) and its replacement with a different pack. The effect, in this situation, could be an overwriting and destruction of valid data on the substituted pack. Detection and correction of this type of error may burden the central system with lengthy analysis and recovery processes which inevitably would degrade the productive performance of the system.

This problem results from the procedures and mechanisms employed in contemporary (prior art) MP systems for making device status information available to any CP which is seeking to start an I/O operation. In contemporary systems, the starting of I/O operations is specified by scheduling elements of an I/O Supervisor program which is part of a more general Operating System Control program (refer, for instance, to GY 28-6616 supra pages 17-21), and is based primarily upon status information contained in a "logical channel" entity whose "nucleus" is a Unit Control Block (UCB) space in main storage (refer to GY 28-6616 supra pages 3-9). Each UCB is associated uniquely with a single device unit. The status information in a UCB can be modified either under control of an Interruption Handling section of the I/O Supervisor program, or by channel and device testing operations explicitly specified by known instructions (e.g. Test I/O and Test Channel) which precede the starting instruction (e.g. Start I/O) for actually initiating the device operation (refer, for instance, to GY 28-6616 supra, pages 17-21, and GA 22-7000 supra, pages 69-74, 88, 95-101, 185-189, 208-239 and 249-252).

Such explicitly specified testing operations enable the central system complex to distinguish whether or not "reportage" of a status change condition is pending in a specific path to the device including a specified channel. When status is pending at the device or an interruption is pending in the channel these operations enable the central system to recover the status information by explicitly programmed actions. We have discovered that the problem arises because such pendency conditions are all terminated when a CP accepts an associated I/O interruption even though the interruption handling process associated with such acceptance (including the updating of the UCB) may be incomplete for an indefinite period of time following the acceptance.

Acceptance of an interruption by a CP involves actions carried out by the CP on a machine level transparent to the supervisory and problem level programs by which other operations of the CP are controlled (refer to GA 22-7000 supra, pages 69-74). Such actions, which are triggered in response to an interruption request condition manifested by the I/O subsystem, involve a change in the program state of the responding CP ("PSW swap") by which control of that CP is transferred to a supervisory level interruption handling (IH) program. This program causes the CP to determine the cause of the interruption (I/O, machine check, etc.) and its source (e.g. for an I/O interruption the IH may cause the CP to determine the identity of the device and the channel—control unit path through which the interruption request has been received). It also causes the CP to perform operations or tasks required by the particular interruption condition (e.g. in respect to an I/O interruption, evaluation of status change information and updating of the logical channel, if relevant).

In such systems the signal stimulus for interrupting the CP is established by the I/O channel processing subsystem (hereafter IOP) after status has been communicated from the device to the IOP and after an associated status pendency condition at the device has been cleared. While this stimulus is pending an associated "interruption pending" condition is manifested under control of the IOP in the subchannel associated with the device. When a CP responds to the stimulus, and accepts interruption, the interruption pending condition is cleared from the subchannel, and the associated status change information is staged in an intermediate buffer in main storage (subject to being transferred to the UCB later under control of a CP program).

We have found that a principal cause of the present problem is that during the time between the acceptance of interruption by a CP (in response to an IOP stimulus), and the actual updating of the UCB, the conditions denoting the changed status may no longer be manifested outside of the central complex. Consequently, during this time explicit tests, by any other CP, of specific paths to the device, may be ineffective for indicating whether status presently in the UCB is current. Therefore, if this other CP controls access to a UCB, it can start an operation at the respective device with reference to outdated (UCB) status even after having conducted tests explicitly relative to the device and subchannel.

This problem is even more acute in a floating channel MP environment. In this environment the storage of an interruption pending condition in a subchannel may be associated with a status change condition communicated from a device to the IOP over any one of several variably affiliated channel interface paths. Without proper safeguards in the IOP subsystem and its affiliated peripheral path elements it would be possible for a status change condition to evade detection even while the central system is explicitly testing the device through one of these channel paths.

The present invention seeks to eliminate such occurrences by means of at least two distinct mechanisms. One mechanism operates in, or in association with, the IOP subsystem for manifesting a condition of status pendency (SP) in any subchannel independent of the interruption stimulus associated with the status, and of any interruption acceptance action by the central complex in response to that stimulus. This SP condition and the associated status change information remain stored in the subchannel until the central complex acts explicitly, under control of its supervisory program, to clear the condition and recover the status. These explicit acts are thereby programmable to occur only under circumstances which preclude intermediate attempts to start a device operation with reference only to outdated UCB status.

Another mechanism associated with the subject invention operates in or in association with the CP's of the central complex to enable any CP to be directed by the operating system to execute a presently unique "test subchannel" (TSCH) operation. This operation includes examination of a specified subchannel, clearance of any SP condition which may be manifested in that subchannel, removal of status information from the subchannel if an SP condition is found, and setting of a condition for program branching as a function of any clearance action taken or not taken; whereby any removed status may be subsequently evaluated and, if suitable, entered into the UCB under control of the operating system. This second mechanism is adapted to perform its operations in response to a newly-defined privileged instruction denoted TSCH. Such privileged instructions are executable only by a CP which is in supervisor state (refer to GA 22-7000 supra page 30). The execution of a TSCH instruction is performed in an atomic (uninterruptible) mode, which ensures that the operations will not be interrupted, and thereby avoids potentially uncertain or ambiguous effects which could occur if the operation could be interrupted.

A third associated mechanism, which is known per se but disclosed in a novel context presently, permits a CP which is blocked from accessing a UCB to perform a presently desirable (but not altogether necessary) operation of storing a flag condition in that UCB. Under program restrictions described herein this flag must eventually be examined by any CP having controlling access to that UCB, and when found to be active it requires the controlling CP to conduct a TSCH operation relative to the associated subchannel. The flag storage operation is performed by "compare and swap" apparatus described in U.S. Pat. No. 3,886,525 and its effect presently is more fully discussed infra. The flag examination operation is scheduled by program conventions to occur just before the CP having earlier access to the UCB relinquishes its control of the UCB. The flag storage, flag examination and conditional TSCH operations enable any CP which may be blocked from access to a UCB while it is handling an interruption task to abort its performance of the task, while ensuring that the CP which then controls the UCB will effectively complete the status updating portion of the aborted task. This eliminates the inefficiency of having the blocked CP "spin" idly on repeated examinations of the UCB until it finds the UCB free.

2. Specific Description of Operations Which Can Cause the Subject Problem

Figure 2:
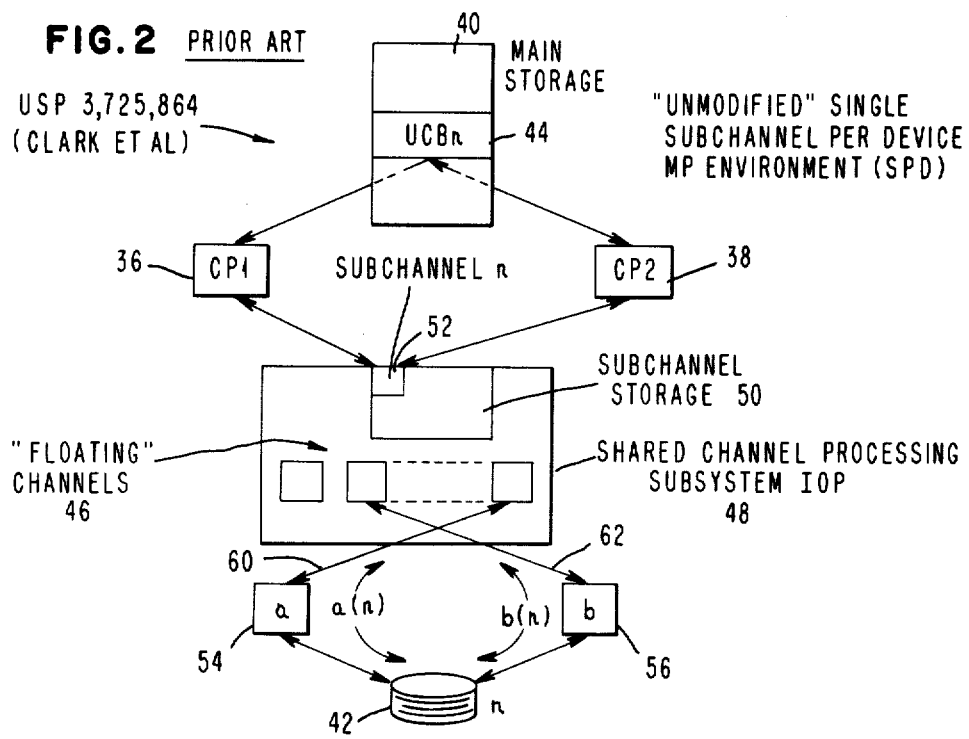
Figure 3:
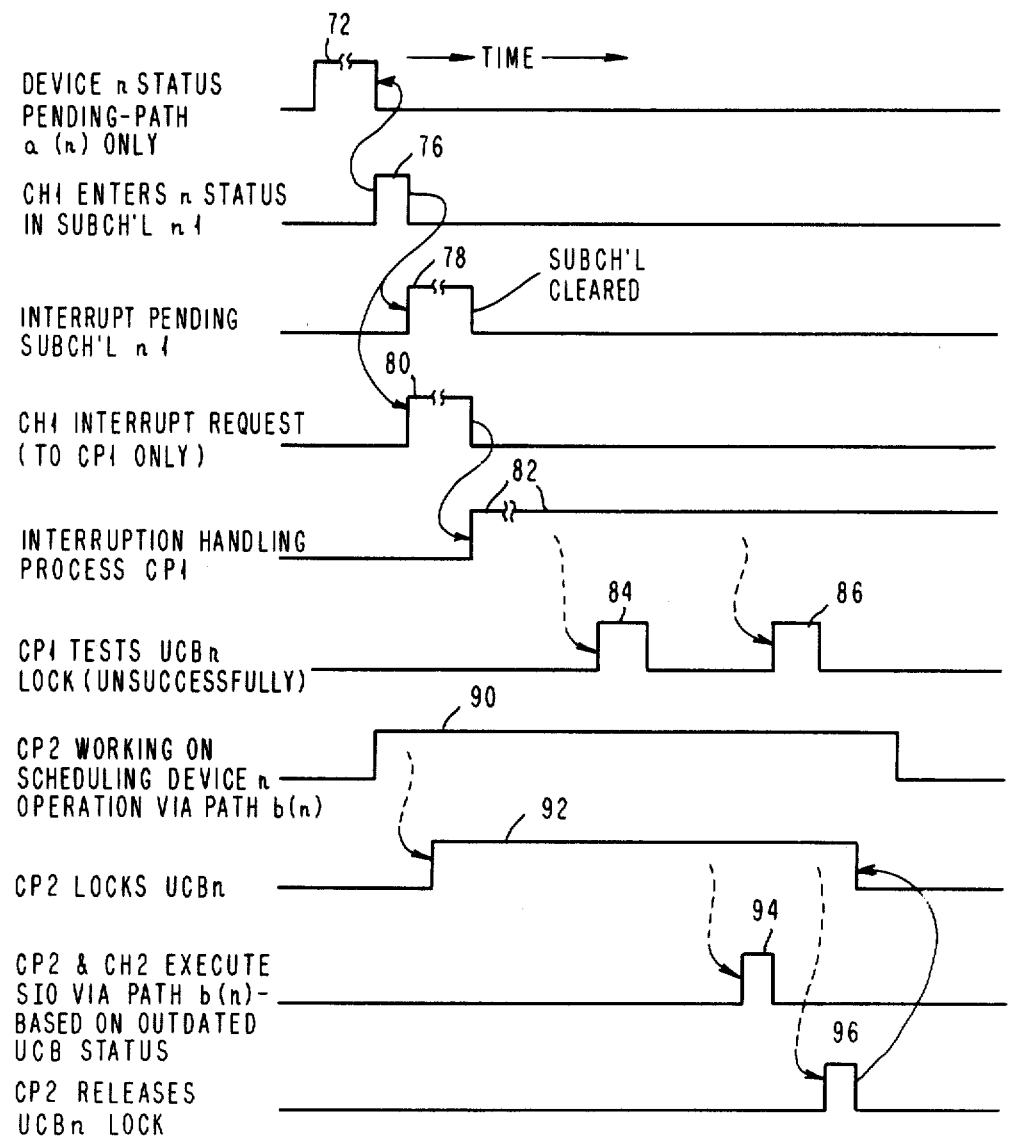
FIGS. 3 and 4 illustrate central system operations in the environments of FIGS. 1 and 2 which give rise to the problem situation addressed by the present invention.
Figure 4:
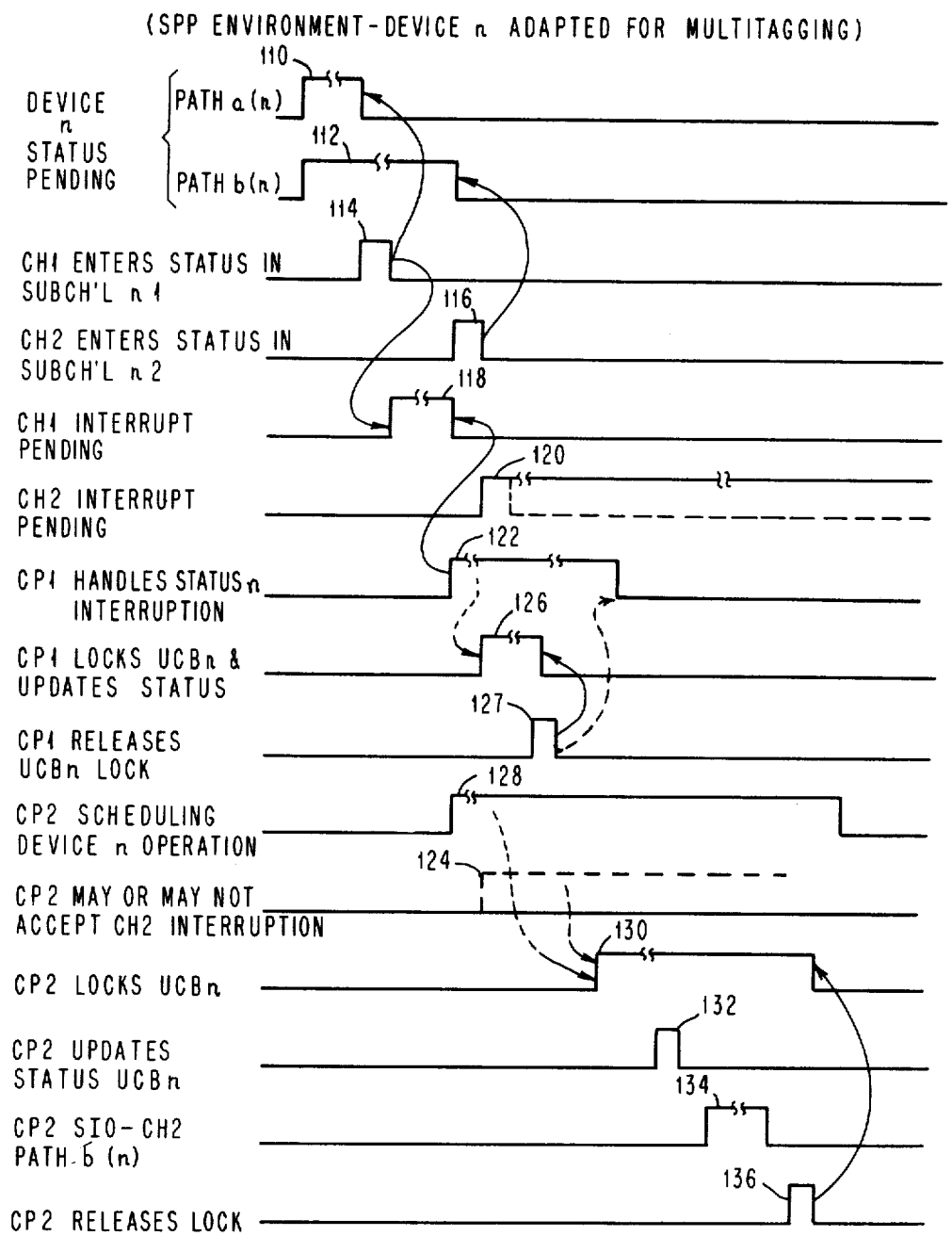

FIGS. 1 and 2 illustrate different "prior art" environmental multiprocessing (MP) systems in which the subject "status loss" problem may arise, and FIGS. 3 and 4 illustrate examples of operations in the respective environments of FIGS. 1 and 2 which cause such occurrences. The configuration of FIG. 1 is hereinafter referred to as the "subchannel per path" (abbreviated SPP) environment, and the configuration of FIG. 2 is referred to herein as the "unmodified subchannel per device" (abbreviated SPD) environment. The term "unmodified" is used in the preceding sentence to distinguish the configuration of FIG. 2 from the "modified" SPD configuration which is described infra with reference to FIGS. 5–13, the latter configuration embodying the subject invention.

As implied by their designations, the SPP configuration contains a separate subchannel for each discrete channel path between a shared device and the central complex, while the SPD configuration contains only a single subchannel for each device which is common to all channel paths associated with the device.

The SPP configuration (FIG. 1) includes two (or more) CP's indicated at 16 and 18, also identified respectively as CP1 and CP2. These CP's have access to a main storage 20 and a shared device n indicated at 22. Main storage 20 contains a UCBn uniquely associated with device n. Device n, illustrated as a disk pack, may connect with the CP's and main storage 20 via two or more paths. For simplicity, only two paths are shown; a first path "a(n)" to CP1 and main storage, and a second path b(n) to CP2 and main storage. Path a(n) includes a control unit 24, also identified as "control unit a", and a channel 26, also identified as CH1. Path b(n) includes a control unit 28, also identified as "control unit b", and a channel 30 also identified as CH2. The paths a(n) and b(n), which may be entirely separate from each other, have separate associated subchannel facilities 32 and 34, respectively, also identified respectively as subchannels n1 and n2.

The SPD configuration (FIG. 2) also comprises two or more CP's, represented by CP1 and CP2 shown respectively at 36 and 38. These CP's also have shared access to a common main store 40 and a common disk storage device n shown at 42. Main store 40 contains a space 44 which stores a UCBn uniquely associated with device n. However, this configuration includes a plurality of "floating" channels 46 which are assignable variably, by a common I/O processing (IOP) facility 48, to conduct communications between the CP's and their affiliated devices, including device 42. Furthermore, the channels 46 have access, via IOP, to a single shared subchannel storage facility 50, a portion of which shown at 52 is dedicated exclusively to device 42 and serves as a subchannel for that device relative to I/O transactions conducted through any channels 46.

In the SPD configuration, device 42 connects with the channels 46 via a first path a(n), extending through a control unit "a" shown at 54, and a second path b(n), extending through a control unit "b" shown at 56. Control unit 54 may have physical connection links with any or even all of the channels 46, one of which is suggested at 60. Similarly, control unit 56 may have physical connection links with any or all of the channels 46, one such being suggested at 62. Any channel 46 may communicate with CP1 and/or CP2 via IOP 48. Accordingly, it will be understood that the physical constituents of path a(n) may be varied in time, depending upon which of the links between control unit 54 and channels 46 is chosen by IOP 48 and/or the control unit 54. Likewise, it should be understood that the physical constituents of path b(n) are dynamically variable under the control of IOP 48 and/or control unit 56.

In either configuration, SPP or SPD, a shared access device such as 22 or 42 may be adapted either to indicate pendency of a status change condition over a single path (e.g. over a(n) or b(n)), in an "untagged" mode, or over all paths (i.e. a(n) and b(n)) in the multitagging mode. In either the SPP or SPD configuration, and with the device such as n adapted for operation in either mode, the "status loss" problem addressed by the present invention can occur. FIGS. 3 and 4 illustrate how this occurs in the SPP environment, with the device adapted for operating respectively in the untagged and multitagging modes. From these examples and from subsequent descriptions of the "modified" SPD configuration, those skilled in the art will easily understand how the problem situation may occur in an unmodified SPD configuration (with the device adapted for operation in either the untagged or multitagging mode).

In FIG. 3 device n is assumed to be operating in the untagged mode relative only to CH1 and CP1 (i.e. path a(n)). When it has status to present to CP1 the device, acting through control unit 24, manifests a "status pending" signal 72 over path a(n). When CH1 is free (CH1 may for instance be busy with other control units) it responds with an acceptance signal 76, and stores the associated status information temporarily in subchannel n1 together with an "interruption pending" indication 78. At the same time CH1 causes an interruption request associated with subchannel n1 to be manifested to CP1. When CP1 is free it signals acceptance of interruption, which causes CH1 to clear the interruption pending condition and transfer the device n status information from subchannel n1 to a space in main storage 20 permanently dedicated as an intermediate status buffer for all channels. Then CP1 starts to perform the associated interruption handling process as suggested at 82. While performing the interruption handling tasks CP1 will transfer the status from the intermediate buffer for all status to one or more intermediate buffer spaces allocated temporarily for evaluating device n status. If the status is correct UCBn will be updated.

While performing the interruption handling process CP1 may attempt to access UCBn by testing a lock word in that UCB. As suggested at 84 and 86, these attempts/tests may be unsuccessful because the lock on UCBn may then be controlled by CP2 which, as suggested at 90, may then be working on starting an operation at device n (via path b(n)) and, as suggested at 92, may have taken prior control of the UCBn lock. In this situation, as suggested at 94, it is possible for CP2 and CH2 to execute an initiating instruction Start I/O (SIO) relative to device n, via control unit 28, with reference only to outdated status information then available in UCBn, even while CP1 has been trying to update this information.

In FIG. 4, in the same SPP environment but with device n adapted for multitagging, device n manifests its status pending condition over both paths a(n) and b(n) as suggested at 110 and 112. However, since the constituents of these paths (control unit 24 and CH1 in a(n) and control unit 28 and CH2 in b(n) have different work loads, their responses to these status pending manifestations (storage of status in subchannels n1 and n2 respectively) will occur at different times, 114 in a(n) and 116 in b(n). Accordingly, associated manifestations of interruption pending conditions relative to CP1 and CP2 will start at different times, shown respectively at 118 and 120, whereby CP1 and CP2 may be caused to perform redundant interruption handling processes 122 and 124 starting at such different times, relative to the one status change event. In its interruption process CP1 may be able to lock UCBn and update status as shown at 126, and release the lock as shown at 127, even before CP2 has made any attempt to access this UCB.

While CP1 is handling its interruption, CP2 may be working to start an operation relative to device n, as suggested at 128, and as suggested at 130, CP2 may lock the UCB belatedly, either in connection with this starting function or in connection with its rebundant handling of the multitagged interruption. Thereafter CP2 may update UCBn status as shown at 132, and perform the initiating SIO operation as shown at 134, before releasing the lock at 136.

3. Description of the Subject Invention and Associated Apparatus

FIGS. 5–14 illustrate a preferred embodiment of adaptation of the SPD configuration of FIG. 2, in accordance with the subject invention, which eliminates the foregoing "status loss" problem. The circumstances in which status loss could have occurred, were it not for such adaptation, and the extension of this adaptation to the relatively simpler SPP configuration will become obvious to those skilled in this art as the description progresses.

In FIG. 5, CP1 and CP2 respectively shown at 210 and 212, are indicated as being modified in a manner illustrated in FIGS. 8–11, and main storage 40 is shown as having a modified UCBn 214 for each device n. Furthermore, a modified IOP processor associated with the "floating" channels 46 is shown at 220 as being modified in a manner illustrated in FIG. 6 and a modified subchannel store is shown at 222.

Each modified UCB 214 includes a lock word having special bit spaces 230, 232 and 234 which are used in association with the subject adaptations of the CP's and the IOP, in a manner to be described, to improve performance efficiency in respect to CP handling of interruptions. Bit 230 is used to indicate whether the respective UCB is locked (busy) or unlocked (not busy). Bits 232 and 234 are used to indicate that a respective CP (CP1 or CP2) has unsuccessfully tested the lock. Although UCBn is shown as having only two bits 232, 234 for this purpose, it will be understood that in any practical system there will be a sufficient number of such bits to provide a contention indication for each potentially linkable CP.

The device n shown at 42, and the "a" and "b" control units shown at 54 and 56 respectively, are the same as like-numbered elements shown in FIG. 2, and require no specific adaptation in respect to the subject invention. The device n may or may not be adapted for multitagging and it will be seen that such adaptation or non-adaptation will not affect the operations of the (yet to be described) subject adapting mechanisms in the IOP, subchannel store and CP's.

Figure 7:
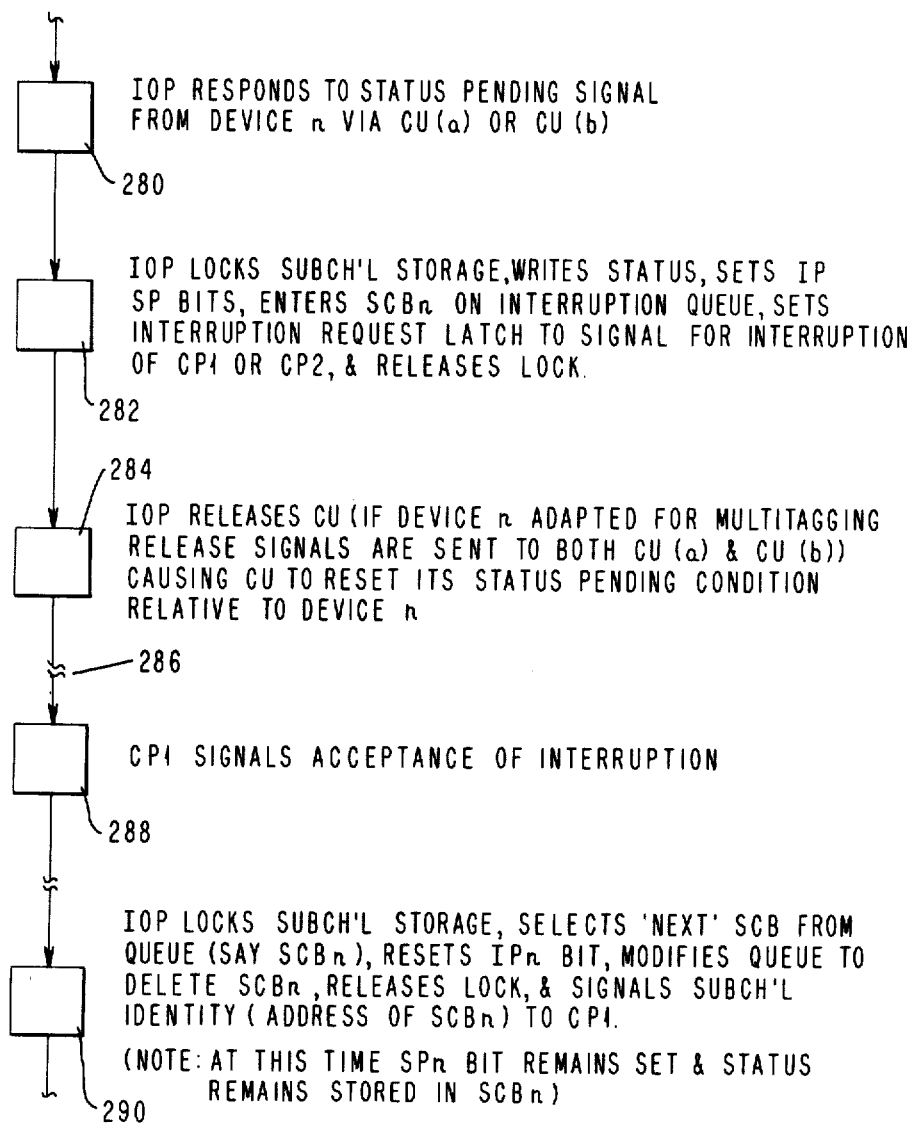

The adaptations of IOP 220 and subchannel store 222, in accordance with the subject invention, are shown in FIG. 6. The operations of the IOP, and subchannel store as adapted, are indicated in FIG. 7. As shown in FIG. 6 the adaptively modified subchannel store 222 includes a Subchannel Control Block (SCB) storage space 238 for each device. In this space, the IOP stores the status of the respective device and its associated control unit path elements as suggested at 240. The space 238 allotted to device n is termed SCBn. Each space such as SCBn includes a pair of bit slots 242 and 244 for respectively indicating "interruption pending" (IPn) and "status pending" (SPn) conditions relative to the associated space.

IPn is set to 1 when the IOP has positioned SCBn in an interruption queue as described infra, and IPn is reset to 0 when SCBn is removed from the queue in association with acceptance of interruption by a CP. In accordance with the present invention, SP1 is set to 1 when status is stored in SCBn and remains in that state until a "test subchannel" operation directed to SCBn is performed by a CP under control of the central operating system.

Although not indicated in FIG. 6, subchannel store 222 is accessible both to the IOP and each of the CP's (at different times). Furthermore, although store 222 is shown as a separate entity it is contemplated that this store may be embedded in the main store 40 (FIG. 5) without altering the operations required of the apparatus to be described.

Relative to the subchannel store 222, IOP 220 includes logic means 244 for modifying information in the SCB spaces, and logic means 246 for manifesting interruption requests to the CP's and maintaining a queue of subchannels associated with such requests. This "interruption" queue, which is served on a first-in first-out basis, is described below but it is not shown in the drawings because it is not directly relevant to the present invention.

Logic means 244 includes means 248 for modifying information contained in any SCB, and associated means 250 for manipulating the bit conditions IPn and SPn in that SCB. Logic means 246 includes means 252 for manifesting an interruption request signal to the CP's via line 253, while the interruption queue contains at least one unserviced SCB, and means 254 for causing a new element (SCB) to be added to the interruption queue (by causing logic 248 to insert queue linking address indications into the SCB which is currently being entered on the queue, and into the preceding SCB entry if the queue was not empty prior to the present entry, by modifying a "next element" pointer associated with the queue to point to the SCB which is currently being entered if the queue was empty prior to this entry, and by setting a "not empty" indication when an entry is being made to a formerly empty queue).

Logic 246 also includes means 256 for removing SCB's from the interruption queue one at a time, on a FIFO basis, in response to interruption acceptance signals received from the CP's via lines 258. In association with each such removal, logic 256 (via a not shown connection) causes logic 248 to modify the next element pointer and linkage indicators of the interruption queue, and to reset the "not empty" indication if the present removal operation vacates the queue. Logic 256 also causes the identity (address) of the removed SCB to be signalled to the accepting CP via lines 260.

The sequence of operations of the apparatus shown in FIG. 6 relative to one subchannel associated with device n is indicated in FIG. 7. When a status pending signal from device n via control unit 54 or 56 (or both if device n is adapted for multitagging operation) is received by one of the channels 46, as suggested at 280, the IOP is stimulated at 282 to modify SCBn and enter it on the interruption queue. In the operations 282 the IOP obtains an "atomic" lock on subchannel storage (exclusive control of subchannel storage for the duration of operations 282), writes status information received from one of the control units, 54 or 56, into SCBn, sets IPn and SPn to 1, modifies the interruption queue to include SCBn as its last entry, establishes an interruption request signal relative to the CP's if the queue was vacant prior to this entry, and thereafter releases its lock on subchannel storage.

In conjunction with or following these actions, the IOP acts as shown at 284 to stimulate a channel (or channels) 46 to release the control unit(s). This causes the control unit(s) to clear the status pending condition from its (their, in the multitagged case) respective path(s).

At some arbitrary later time, suggested by the "break" at 286, one of the CP's (in this case assumed to be CP1) responds to the outstanding interruption request signal from the IOP and signals acceptance of an interruption as suggested at 288. When this occurs, the IOP acts as shown at 290 to remove the "oldest unprocessed SCB entry" (i.e. the oldest entry having an IPn bit set to 1) from its interruption queue (in this instance, assumed to be SCBn), modifies its queue information appropriately (resets the IP bit in the removed entry SCBn, revises the queue linkage functions and pointers to delete SCBn, etc.) and signals the identity (address) of the removed entry SCBn. This completes the handling of SCBn by the IOP and leaves SCBn with its SP bit still set to 1.

Figure 8:
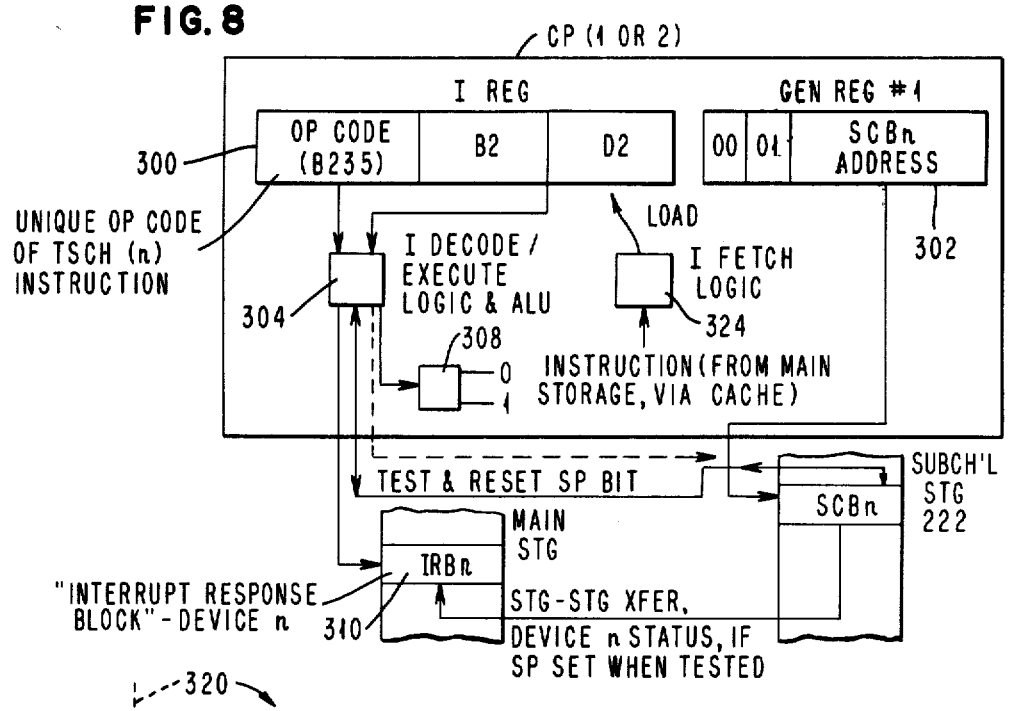
Figure 9:
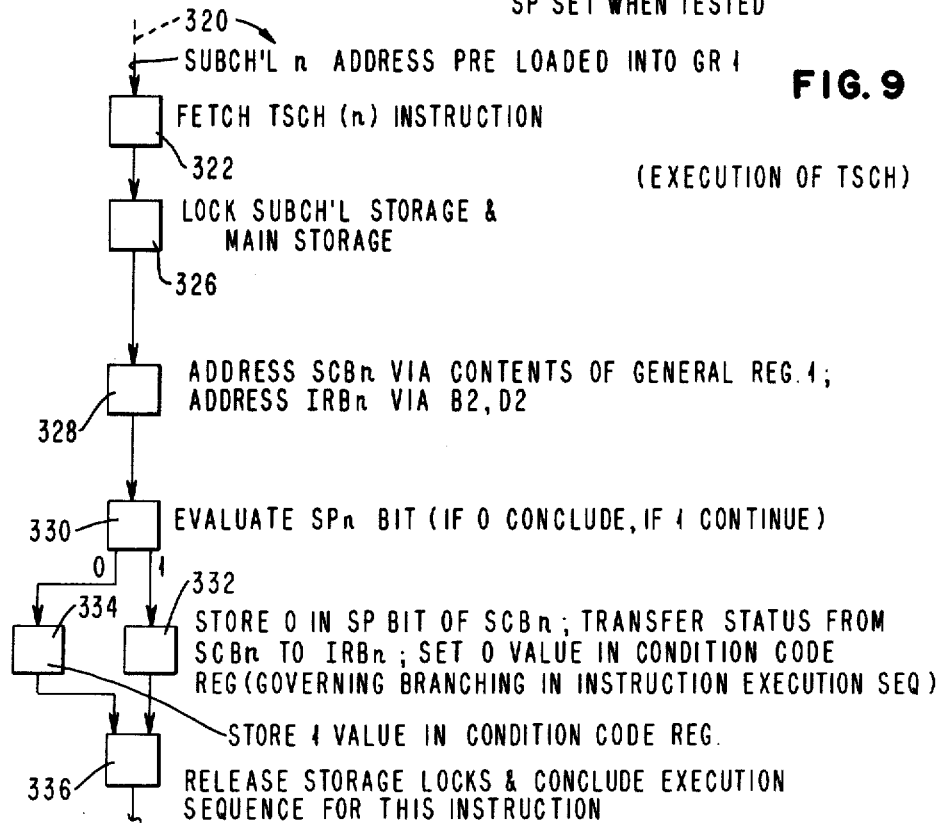

The principal modification of the CP's, in respect to the present invention, is illustrated in block schematic form in FIG. 8. Associated operations of this equipment are shown in FIG. 9. As shown in FIG. 8, a new instruction Test Subchannel (abbreviated TSCH), when staged in the instruction register 300 of a CP, in conjunction with prior preparation of address information in a general register (CR1) indicated at 302 (such information identifying the address in subchannel storage 222 of a particular subchannel such as SCBn), causes instruction decoding controls and arithmetic logic 304 in the CP (as newly modified for execution of this instruction) to evoke presently novel operations which cause the CP to read out the SP bit of SCBn (from subchannel storage 222), examine the value of that bit, write a 0 value into the SP bit slot of SCBn, and conditional upon the value of the tested bit set a condition code value 0 or 1 in a condition code (bit) register 308. If condition code 0 is set, status is read out of the addressed SCBn and stored, in main storage, in a space 310 temporarily allocated by the operating system for this purpose. This temporary space is referred to herein as the "interruption response block space" or IRB in association with the addressed SCB (i.e. the IRB for SCBn is designated IRBn).

The operations associated with execution of a TSCH instruction are indicated in FIG. 9. Prior to such execution, as suggested at 320, the address of the targeted SCBn is loaded into register 302 (by actions evoked by instructions preceding the TSCH instruction). The TSCH instruction is then fetched from main storage as indicated at 322 (by operation of the conventional instruction fetching controls indicated at 324 in FIG. 8).

At 326, the CP circuits 304 for executing instructions react to detection of the OP CODE of a TSCH instruction (code B235) and obtain "atomic" locks on main storage and subchannel storage in preparation for the following operations. At 328, SCBn is addressed using the address in register 302, and an address is prepared for conditionally accessing the associated IRBn (310, FIG. 8). The address for SCBn is formed by adding the contents of the D2 field of the TSCH instruction to the contents of the register specified by the B2 field of the instruction (of course the values of B2 and D2 will have been set up by preceding instructions to form this address of IRBn).

In the next operation 330, the CP acts to remove the Spn bit from the addressed SCBn and to examine its value. If the value is 1, meaning that status is pending in the respective subchannel SCBn, the CP performs operations 332, which include storing a 0 value in the SPn bit slot of SCBn, transferring status information from SCBn to IRBn, and setting a 0 condition code value in condition code register 308. If the value of the examined SPn bit is 0, the CP acts at 334 to store a 1 in condition code register 308.

The setting of the condition code value may be used to condition the selection of one of two sequences of instructions following the TSCH execution; it will be understood that one such sequence, associated with condition code 0, may be used for evaluating the status and conditionally updating UCBn, and the other sequence associated with condition code 1 may "skip" such evaluation and selective updating. At 336, after either operation 332 or 334, the storage locks established at 326 are released and the execution sequence for the TSCH instruction is concluded.

Ancillary and desirable (but not essential) operations employing apparatus shown in FIG. 10 and described with reference to FIG. 11, permits the subject system to ease the burden of a CP which is performing interruption handling but is blocked from accessing a UCB to complete the updating of status. These ancillary operations permit the blocked CP to abort its handling of the interruption while insuring that the CP which then controls the UCB will, in conjunction with program restrictions described herein, complete the aborted (status updating) task.

Figure 10:
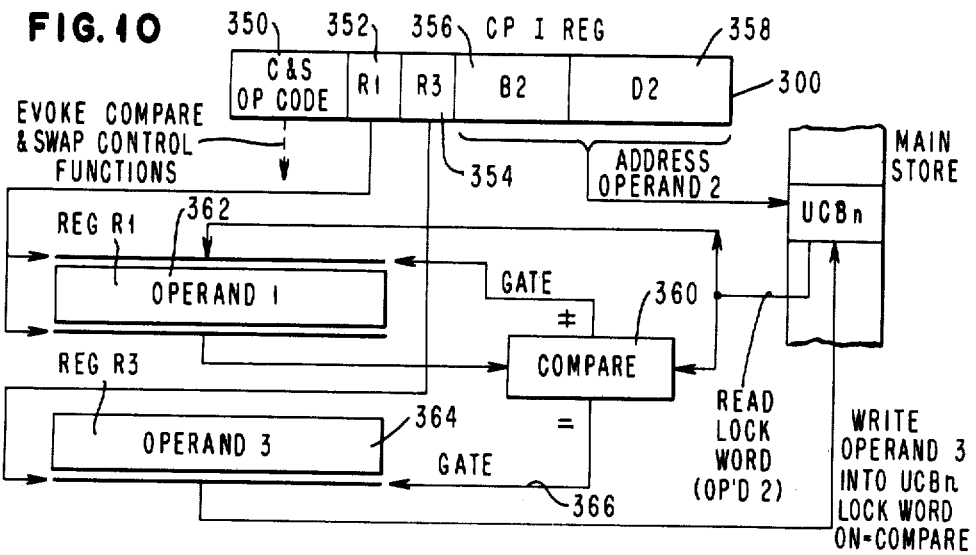

The apparatus shown in FIG. 10 is identical to the "compare and swap" apparatus described in U.S. Pat. No. 3,886,525 by P. J. Brown et al which has been referred to previously, but acts in a unique context presently to provide a basis for the desirable ancillary operations referred to above. This apparatus executes the "compare and swap" instruction (C&S) which is shown in FIG. 10 as it appears when staged for execution in the CP instruction register 300. This instruction includes an OP code portion, which conditions the instruction decoding apparatus 304 (FIG. 8) to perform the subject compare and swap operations, two fields R1 and R3 for specifying general registers, and fields B2 and D2 for defining a storage address. The OP code is shown at 350, the R1 and R3 fields are respectively indicated at 352 and 354, and the B2 and D2 fields are indicated respectively at 356 and 358.

In respect to the present ancillary operations, the result of adding displacement D2 to the content of the register defined by B2 is used to address a lock word field in UCBn (operand 2) which is to be evaluated. The addressed lock word is read out of storage and applied to one side of compare circuit 360 while the operand 1 contained in the general register 362 specified by R1 is applied to the other side of compare circuit 360. Compare circuit 360 compares the two inputs (operands 1 and 2) and produces either an "equal" (=) output or a "not equal" ($\neq$) output. If the equal output is generated, operand 3 (the contents of the register 364 which is specified by R3) is transferred through gates indicated generally at 366 and written into the lock word field of UCBn, replacing the operand 2 value previously held therein. If the comparison result is unequal, then the operand 2 word read out of the UCB is gated into register 362 and replaces the operand 1 value previously contained therein.

This instruction is used presently to enable a first CP (e.g. CP1) to determine whether or not a second CP (e.g. CP2) currently controls access to a given UCB (e.g. UCBn) and to set a flag in that UCB for conditioning the second CP to complete an operation (e.g. status updating) which may then potentially be aborted by the first CP. The restrictions imposed on the execution of this instruction (refer to GA22-7000 supra at pages 123 and 124) enable the first processor to determine, when it executes the instruction, whether or not the second processor has relinquished its control of the UCB lock prior to the execution of the instruction and thereby enables the first processor to decide if it should repeat its bid for access to the UCB (by repeating its execution of the instruction with revised R1, R3 parameters), or abort its (interruption handling) operation and rely on the second processor to complete the updating of the UCB.

Figure 11:
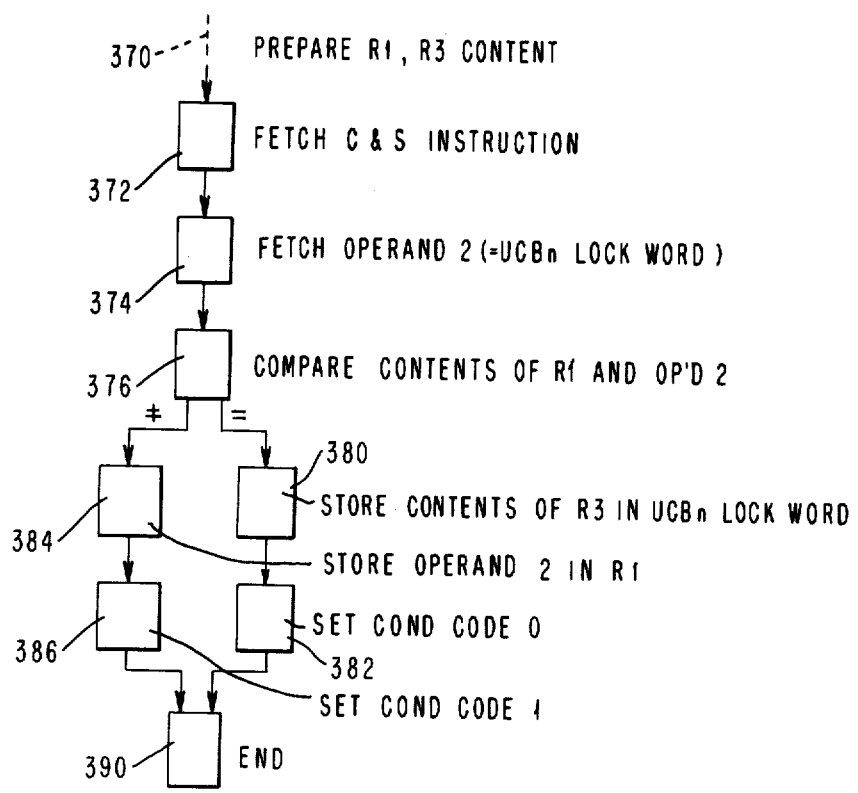

Referring to FIG. 11, the (C&S) instruction is used as follows. Assume first that CP2 controls the lock on UCBn for some time prior to CP1 execution of the instruction and during the execution. Prior to execution, at 370, CP1 reads the present UCBn lock word (without change), evaluates it and determines (from its value) that CP2 then controls the lock. CP1 then acts at 370 to place the fetched lock word into (operand 1) register 362 and to load a modified lock word into register 364. The modified lock word contains a flag bit which indicates that CP1 has unsuccessfully sought access to UCBn during CP2's tenure of control. At 372, CP1 fetches the compare and swap instruction to instruction register 300. At 374, CP1 fetches operand 2 (the UCBn lock word) and at 376, CP1 compares operand 2 to operand 1 (word in register 362). If the status of CP2 control has not changed during the execution of operations 370–376, as presently assumed, the compared operands will be equal and CP1 will perform actions 380 and 382. Action 380 stores the modified lock word in UCBn and action 382 sets a condition code value of 0 associated with equal comparison.

On the other hand, if CP2 had relinquished its control of the UCBn lock prior to or during CP1's execution of the instruction, it would have changed the lock word (operand 2 value) so that comparison 376 would have indicated an unequal condition. In that case, CP1 would have performed operations 384 and 386; operation 384 substituting operand 2 for operand 1 in register 362, and operation 386 setting condition code 1. After performing either sequence, 380, 382 or 384, 386, CP1 concludes the instruction execution sequence as shown at 390. Afterwards, branching on the condition code CP2 may analyze the new value in register 362, if the condition code is 1, determine that UCBn may now be accessible, and execute a second C&S instruction to attempt to secure control of the UCBn lock.

Figure 12:
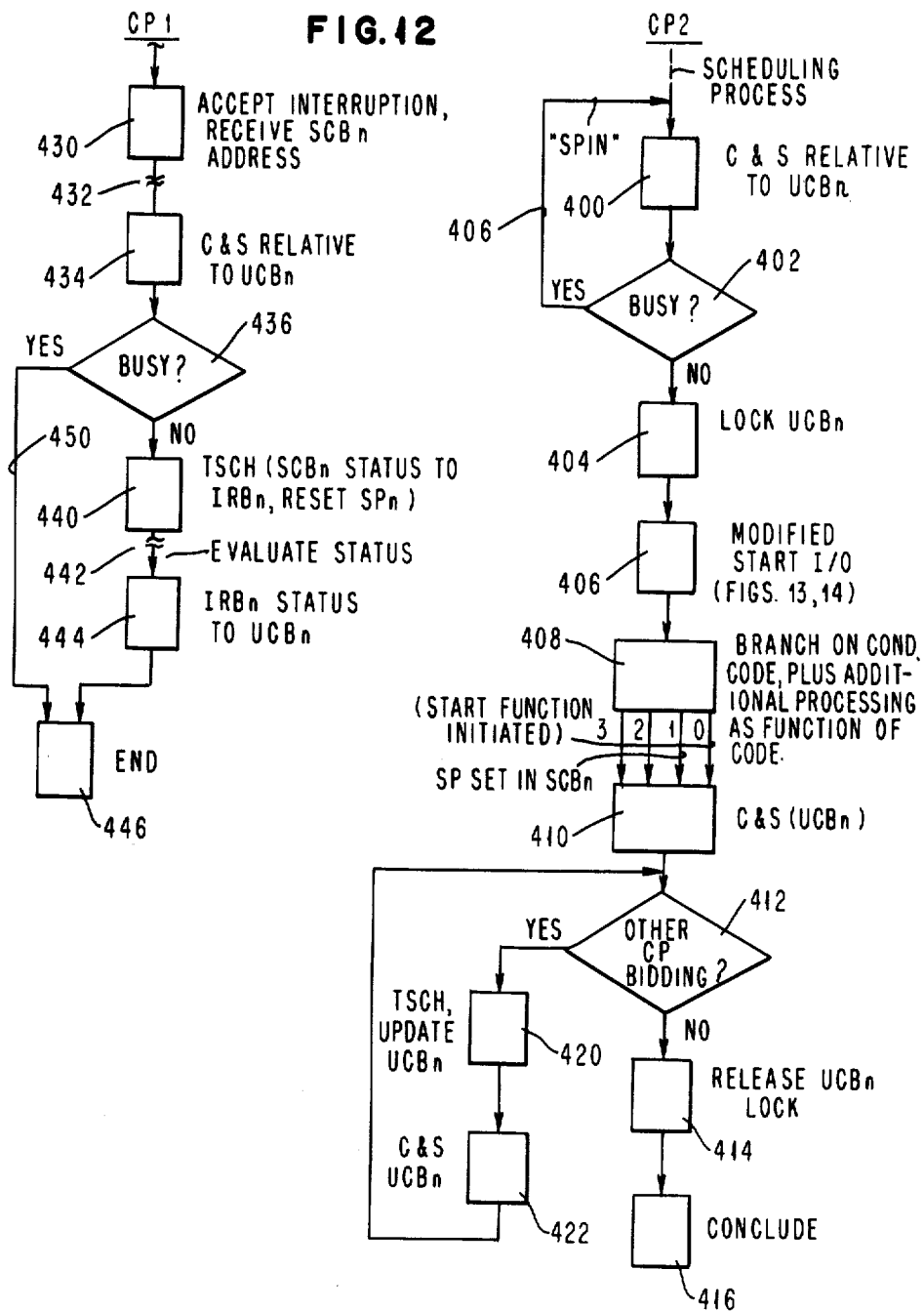
FIGS. 12-14 illustrate how the adapted system of FIGS. 5-11 operates to handle interruptions and start device operations in accordance with the present invention.

FIG. 12 indicates how in the environment of FIG. 5 apparatus of FIG. 8, for executing TSCH, operates in conjunction with apparatus of FIG. 10 for performing the ancillary compare and swap function to eliminate the subject status loss problem. In this figure, it is assumed that CP2 is working relative to path b(n), FIG. 5, to start an operation at device n, while CP1 is working concurrently to process a status change received from the same device via path a(n), FIG. 5.

Considering first the operations of CP2, at 400 CP2 executes a compare and swap instruction relative to UCBn. At decision point 402, if this operation indicates that the UCB is accessible (equal comparison), a modified lock word is stored at 404 indicating that CP2 controls the UCB. If the UCB is not accessible (unequal comparison) CP2 sets a condition code 1 and branches via path 406 to re-execute the instruction after a delay. This "spinning" action continues until CP2 gains access to UCBn, and completes the associated locking action 404.

After gaining access to UCBn, CP2 acts at 406 to execute a "modified start I/O" instruction which will be described later with reference to FIGS. 13 and 14. This instruction causes the CP to evaluate the state of the device represented by SCBn, to conditionally store initiating control information in SCBn, and to set one of four condition codes (0, 1, 2 or 3) depending on the evaluated state of SCBn. Depending upon which condition code is set, CP2 performs (different) additional operations suggested at 408 (which will be described with reference to FIG. 14) and then concludes its handling of the initiation scheduling process. Thereafter, CP2 acts at 410 to perform a "final" compare and swap operation. This enables CP2 to determine whether the UCBn lock has been modified since the previous compare and swap operation 400; i.e. to determine whether any other CP (e.g. CP1) has attempted unsuccessfully to obtain access to UCBn.

At decision point 412, CP2 branches on the results of its C&S operation 410. If the results indicate that no other CP has attempted to gain access to UCBn, CP2 acts at 414 to modify the UCBn lock, so as to effectively indicate release of that UCB, and concludes its operation at 416. On the other hand, if CP2 determines at 412 that another CP has unsuccessfully attempted to access UCBn, then it executes operations 420, which includes a TSCH operation for testing the SPn bit in SCBn and conditionally updating UCBn status, if necessary. CP2 then performs another compare and swap operation at 422 and repeats decision 412, enabling CP2 to determine if any CP has attempted to gain access to the UCB while operations 420 were being performed. If necessary CP2 performs operations 420, 422, 412 repeatedly until it determines that no intervening bids for access have occurred since the last updating of UCBn status. Eventually, CP2 will find that the the contents of the UCBn lock have not changed in the interim and take the "no" exit path at 412 to the concluding functions 414, 416.

During the foregoing operations of CP2, as assumed previously, CP1 has been operating to process an interruption relative to device n. Therefore CP1 will have accepted an interruption and retrieved status from SCBn as shown at 430. Then CP1 will have performed other interruption handling operations, suggested at 432, for evaluating the retrieved device status information. Assuming that the status is meaningful CP1 will attempt to gain access to UCBn (for updating its status), by executing compare and swap operation 434, and branch on the outcome of this operation at decision point 436. If the UCB is accessible, CP1 will lock the UCBn and conditionally update UCBn status via operations 440, 442 and 444 (by testing the SPn bit of SCBn, transferring SCBn status to IRBn, setting the SPn bit to 0 in SCBn, evaluating the device status information in IRBn and finally conditionally transferring status to UCBn before concluding its performance of the interruption handling process at 446).

On the other hand, if CP1 finds that UCBn is locked by another CP such as CP2, at decision point 436, CP1 then would merely abort its operation and take sequence route 450 directly to the concluding function 446. It will be understood that if CP1 takes the "yes" path 450 at decision point 436, CP2 which then controls UCBn will at some later point, by virtue of one of its C&S operations 410 or 422, recognize that it has blocked the operation of CP1 and CP2 will then act as indicated at 420 to test SCBn and update UCBn (functions which otherwise would have been performed by CP1).

As indicated above, one of the operations 406 performed by CP2 is the execution of a modified start I/O instruction. The apparatus for performing this instruction is shown in FIG. 13 and the actions associated with its execution are shown in FIG. 14.

Figure 13:
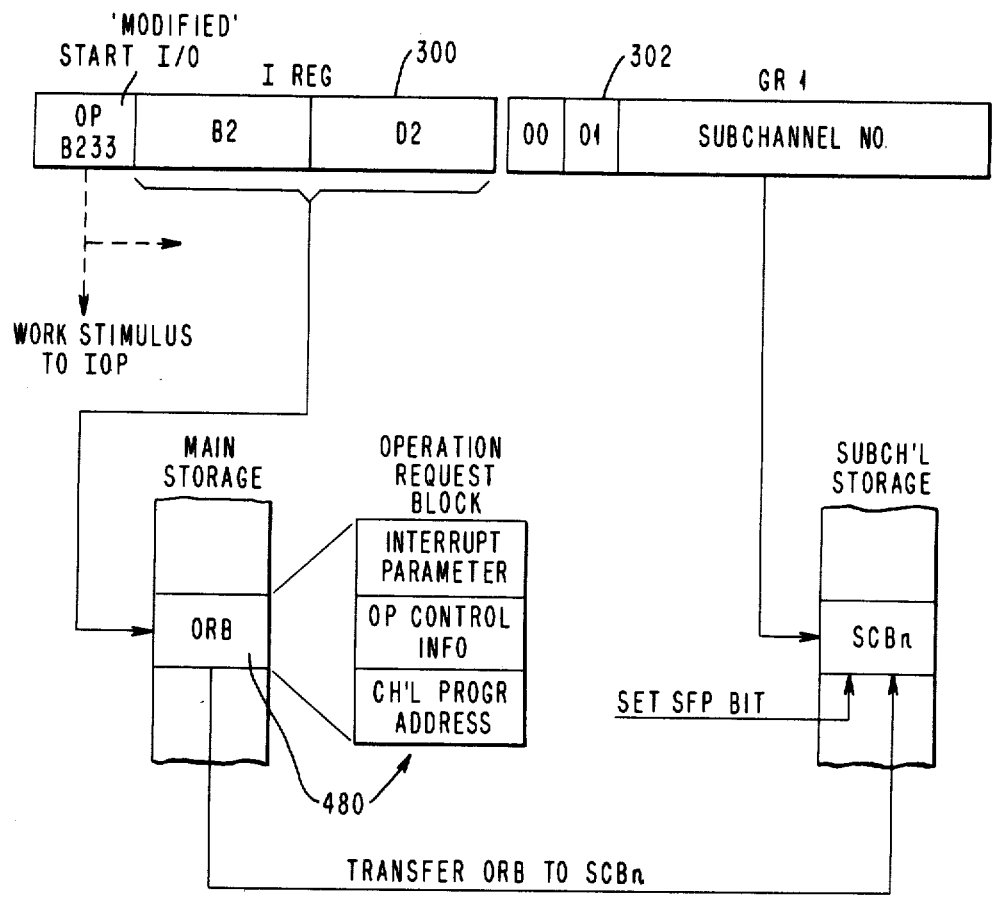

FIG. 13 shows this instruction as staged for execution in CP instruction register 300. At such times general register 302 is pre-loaded with information defining the location of a specific subchannel, in this case SCBn, and the "second operand" defined by the B2 and D2 parameters of the instruction specify an operation request block (ORB) space 480 in main storage which is prearranged to contain the parameters defining the starting operation. These parameters, named in FIG. 13, are not discussed presently inasmuch as they are not relevant to the present invention.

Figure 14:
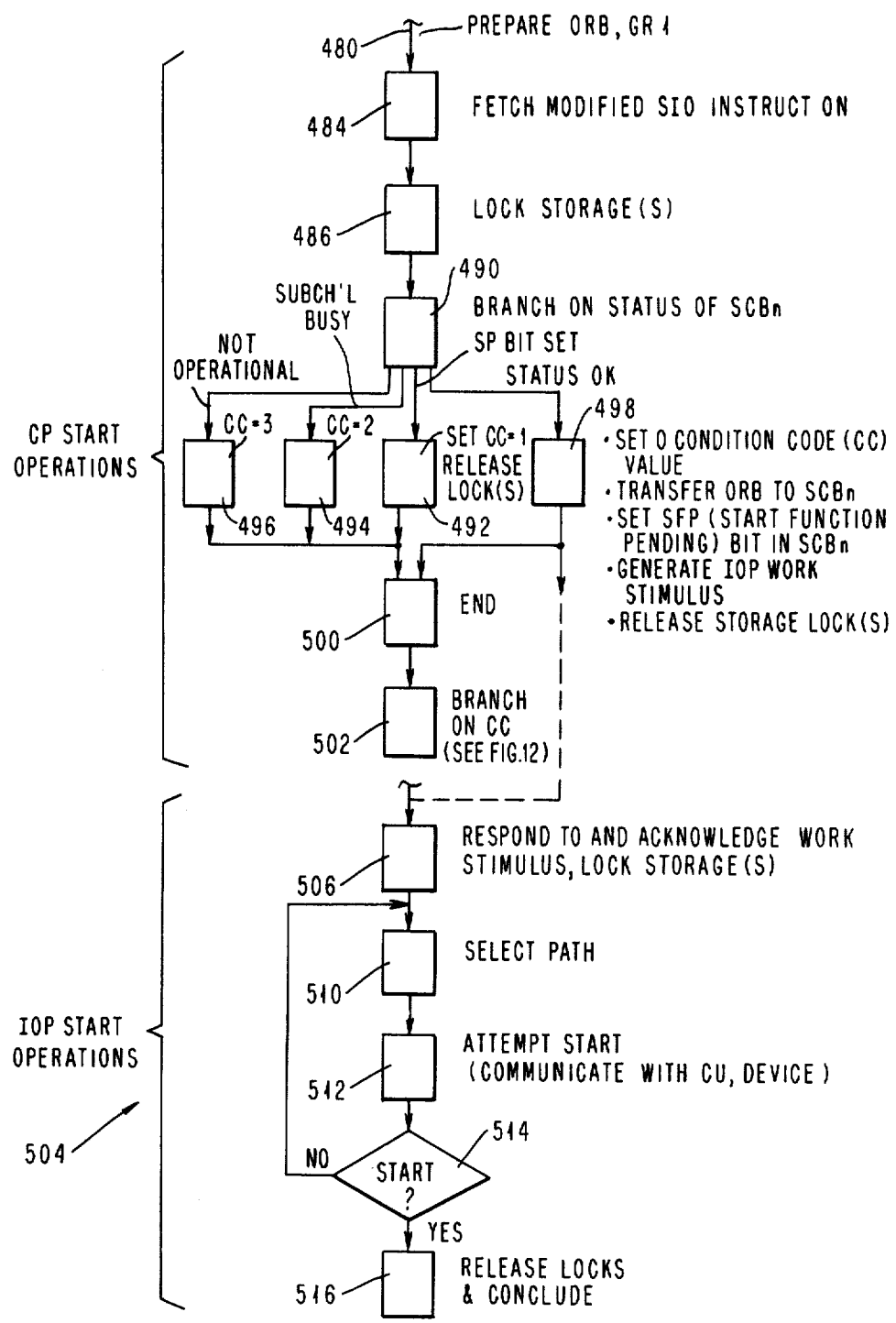

As indicated in FIG. 14, the operations 484–502 associated with execution of the modified start I/O instruction are performed only by the CP without any interaction with the IOP. Thereafter, as indicated at 504, the IOP, if properly stimulated, will proceed to perform associated operations for selecting a path to the device, and initiating communication with the device, while the CP may be performing other functions.

After ORB preparation 480 the CP fetches the instruction at 484. At 486 the CP secures atomic locks on subchannel storage and main storage. At 490 the CP evaluates the status of the subchannel (SCB) addressed by the content of register 302 (FIG. 13), and branches on the result to one of the four functions indicated at 492, 494, 496 or 498. If the SP bit in SCBn is set (=1) the CP performs operation 492 setting the instruction condition code to 1 and releasing the atomic locks. If SCBn state information indicates that the subchannel does not have status pending but is in a busy condition, the CP executes operation 494 setting the instruction condition code to the value 2 and releasing the locks. If the SCBn state information indicates that the device is not operational (either not installed or not operating)

the CP executes operation 496 setting the condition code to the value 3 and releasing the locks. Finally, if none of the foregoing exceptional conditions are found, and therefore if the subchannel is in a state suitable for starting the operation, the CP executes operations 498 to: set the condition code value to 0, transfer the initiating control information from the ORB in location 480 (FIG. 13) in main store to SCBn in subchannel storage, set an SFP (start function pending) bit in SCBn to a 1 value as an indication that the operation in question is now pending for advancement by the IOP, generates an IOP work stimulus to excite the IOP to continue the operation as discussed infra, and release the locks.

After executing one of the operations 492, 494, 496 or 498, the CP performs concluding operations suggested at 500, which conclude its execution of the modified start I/O instruction, and may then proceed to perform operations 502 to evaluate the conditions set by operation 492, 494, 496 or 498. The operations 502 correspond to the operations 410 through 420 discussed in reference to FIG. 12.

As indicated at 504, after the CP has performed its concluding operations 500, and assuming that the CP has generated an IOP work stimulus via operation 498, the IOP when free responds to said stimulus and performs operations 506–516 for advancing the initiation process. At 506 the IOP acknowledges the work stimulus, and obtains atomic locks on subchannel and main storages. At 510 the IOP performs operations to select a path to the device for attempting to start the operation. At 512 the IOP attempts to communicate with the device via the channel and control unit elements of the selected path.

At 514, IOP branches on the success or failure of this attempt. If the attempt was successful the locks are released at 516 and the operation is carried forward by the selected path elements. If the attempt was not successful, IOP repeats operations 510, 512 and 514 relative to the same or another selected path.

Accordingly, it may be seen that this modified start I/O operation involves separate operations by the CP and IOP whereby the CP need only transfer the contents of the ORB into the subchannel and present work stimulus to the IOP and the IOP thereafter independently controls path selection, device stimulation, etc.

While we have illustrated and described preferred embodiments of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by Letters Patent is:

1. In a data processing system having a channel subsystem and having a central complex arranged to operate with said channel subsystem, said central complex including multiple central processing units and including means for storing the status of a device that is part of the channel subsystem in which a first central processing unit may be locking and accessing said status storing means to start an operation at a device at the same time that a second central processing unit is operating to process information stored in said channel subsystem pertaining to the status of said device, and to update device status in said status storing means while said status storing means is locked by said first central processing unit means for preventing said first unit from starting said operation with reference to outdated status information comprising:

first condition manifesting means in said channel subsystem for manifesting a status pending condition for said device and means in said channel subsystem for actuating said first condition manifesting means to manifest said status pending condition when said channel subsystem receives and stores status change information pertaining to said device;

means in said central complex for testing said manifesting means and means for preventing said first unit from directing a starting stimulus to said device while said status pending condition is being manifested by said first condition manifesting means;

and means in said central complex supervised in common with said first and second central processing units for clearing said status pending condition only when said central complex is capable of supervising the processing of said status information in common with any starting operations directed to said device.

2. A data processing system in accordance with claim 1 additionally comprising:

second condition manifesting means for manifesting an interruption pending condition relative to said central complex in association with said device;

means in said channel subsystem for actuating said first and second condition manifesting means to manifest said respective interruption pending and status pending conditions when said channel subsystem receives and stores status change information pertaining to said device; and means in said channel subsystem for clearing said interruption pending condition when a central processing unit signals acceptance of an interruption for said device; said first condition manifesting means continuing to manifest said status pending condition and said channel subsystem continuing to store said status information after clearance of said interruption pending condition.

3. A data processing system in accordance with claim 2 wherein said means for clearing said status pending condition includes:

means in each of said central processing units for executing a predetermined Test Subchannel Instruction under conditions of access to said status storing means in an uninterruptible mode; said executing means including means for the central processing unit to test the state of said first condition manifesting means, to clear any status pending condition which may then be manifested by said first manifesting means, and to condition the central complex to retrieve and process any status information then stored by said channel.

4. A system in accordance with claim 3 wherein each said central processor unit comprises:

means for accepting interruptions from said channel without regard to the locked or unlocked status of said status storing means;

means for signalling acceptance of an interruption to said channel;

means for determining if the accepted interruption is specifically associated with said device; and means operating with access to said status storing means and responsive to an indication by said determining means that the accepted interruption is specifically associated with said device for conditionally evoking execution of said Test Subchannel operation under supervised conditions which preclude simultaneous or prior stimulation of starting action by said first unit relative to said channel and device.

5. A system in accordance with claim 4 wherein said central complex includes a main store having a Unit Central Block (UCB) storage space for storing status of said device, said UCB space being accessible to each of said central processing units one at a time, said system comprising:

means in each of said central units supervised in common with the other central units for enabling the respective unit to acquire exclusive control of access to said UCB space when no other unit is controlling access to said space and when the respective unit has accepted interruption from said channel and determined that such interruption pertains to said device; and means in each central unit for conditioning said evoking means in the respective unit to evoke said Test Subchannel operation only when the respective unit has assumed exclusive control of access to said UCB space.

6. A system in accordance with claim 1 including:

subchannel storage means in said channel subsystem for storing a Subchannel Control Block (SCB) for said device including a predetermined portion dedicated exclusively for storing an indication of said status pending condition;

means in said channel for storing status change information pertaining to said device in said SCB when such status change information is received by said channel from said device;

means in said channel for storing a status pending condition indication in said dedicated portion of said SCB when said status change information in stored in said SCB; and means in said central complex for generating a signal for clearing said stored status pending condition indication from said dedicated portion of said SCB, said signal being generated only when said status storing means is unlocked to be updated; and means in said channel for clearing said indication in response to said signal, means in said central complex for transmitting signals to said channel for starting said device and means in said channel responsive to signals from said central complex pertaining to starting said device for causing the status pending indication stored in said dedicated portion of said SCB to be read out and manifested to said central complex in association with said starting signals.

7. A system in accordance with claim 6 wherein each of said central unit includes:

means effective during execution of an instruction for starting an operation of said device for causing the respective unit to present signals for stimulating said first condition manifesting means to read out said dedicated portion of said SCB and manifest to the central unit presenting said signals, the condition currently stored in said portion.

8. In a data processing system including a device, central processing apparatus including plural central processing units for initiating data exchange operations with said device, and I/O processing apparatus connecting said central apparatus and said device for controlling said data exchanges concurrent with other operations of said central apparatus, a method of ensuring currency of any status information which is used by said central apparatus to initiate a said data exchange, comprising the steps of:

interrupting one of said central units to indicate to said one unit that status information pertaining to said device is presently stored in a subchannel associated with said device;

manifesting a status pending condition in association with said storage in said subchannel of said status information pertaining to said device; said condition being associated exclusively with said subchannel and said device;

conditioning said central apparatus to explicitly interrogate said status pending manifestation when attempting to start an operation of said device and to suspend or terminate such attempt when said condition is being actively manifested; and conditioning said central apparatus to be able to explicitly test and clear said status pending manifestation under conditions within said central apparatus precluding the starting of an operation relative to said device prior to said testing and clearing operations.

* * * * *